Oct. 18, 1932.  J. F. CREEDON  1,882,656
AUTOMOBILE STORAGE DEVICE
Filed Feb. 10, 1930  4 Sheets-Sheet 3
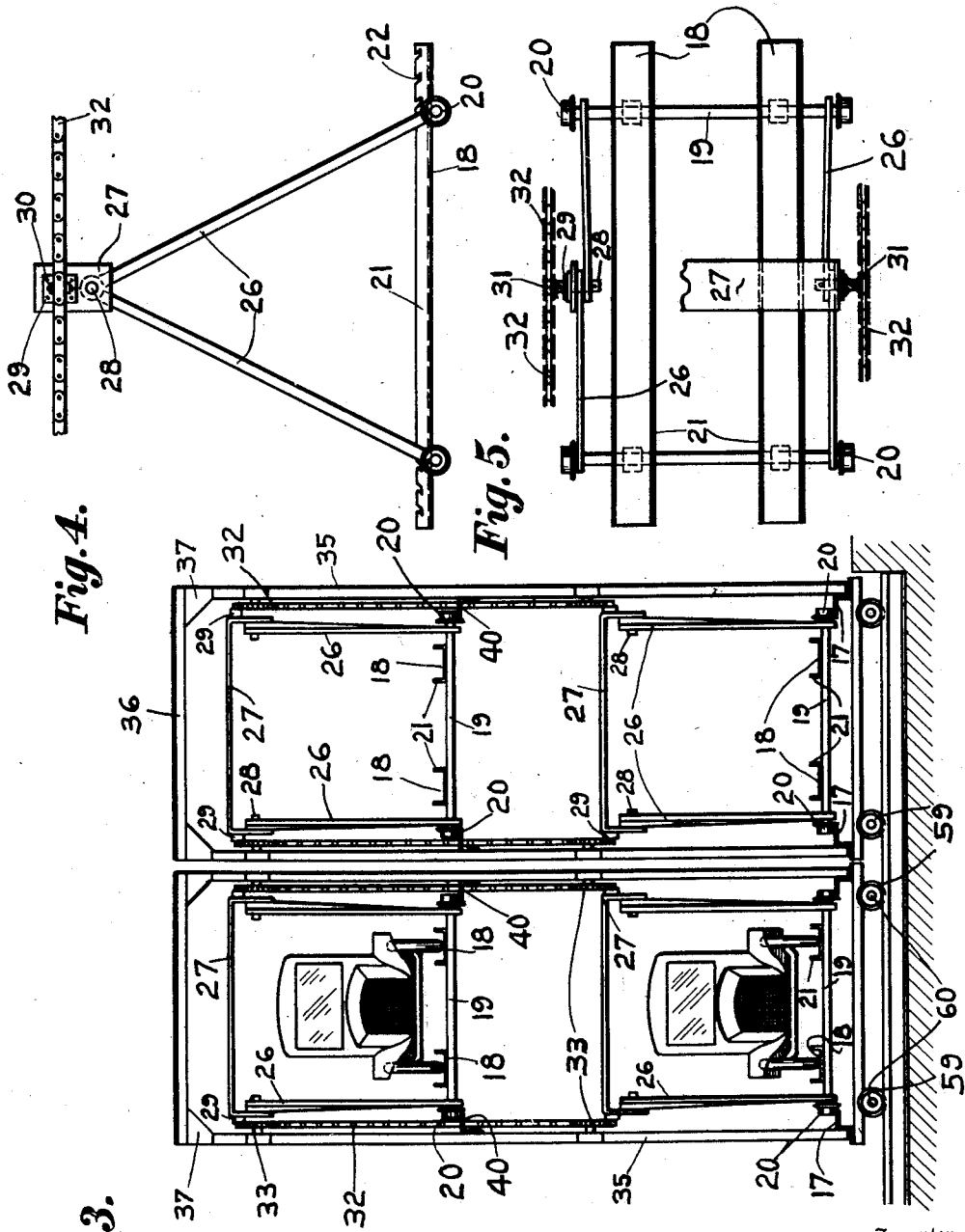
Inventor
J.F.Creedon
By Arthur H. Sturges
Attorney Oct. 18, 1932.    J. F. CREEDON    1,882,656
AUTOMOBILE STORAGE DEVICE
Filed Feb. 10, 1930    4 Sheets-Sheet 4
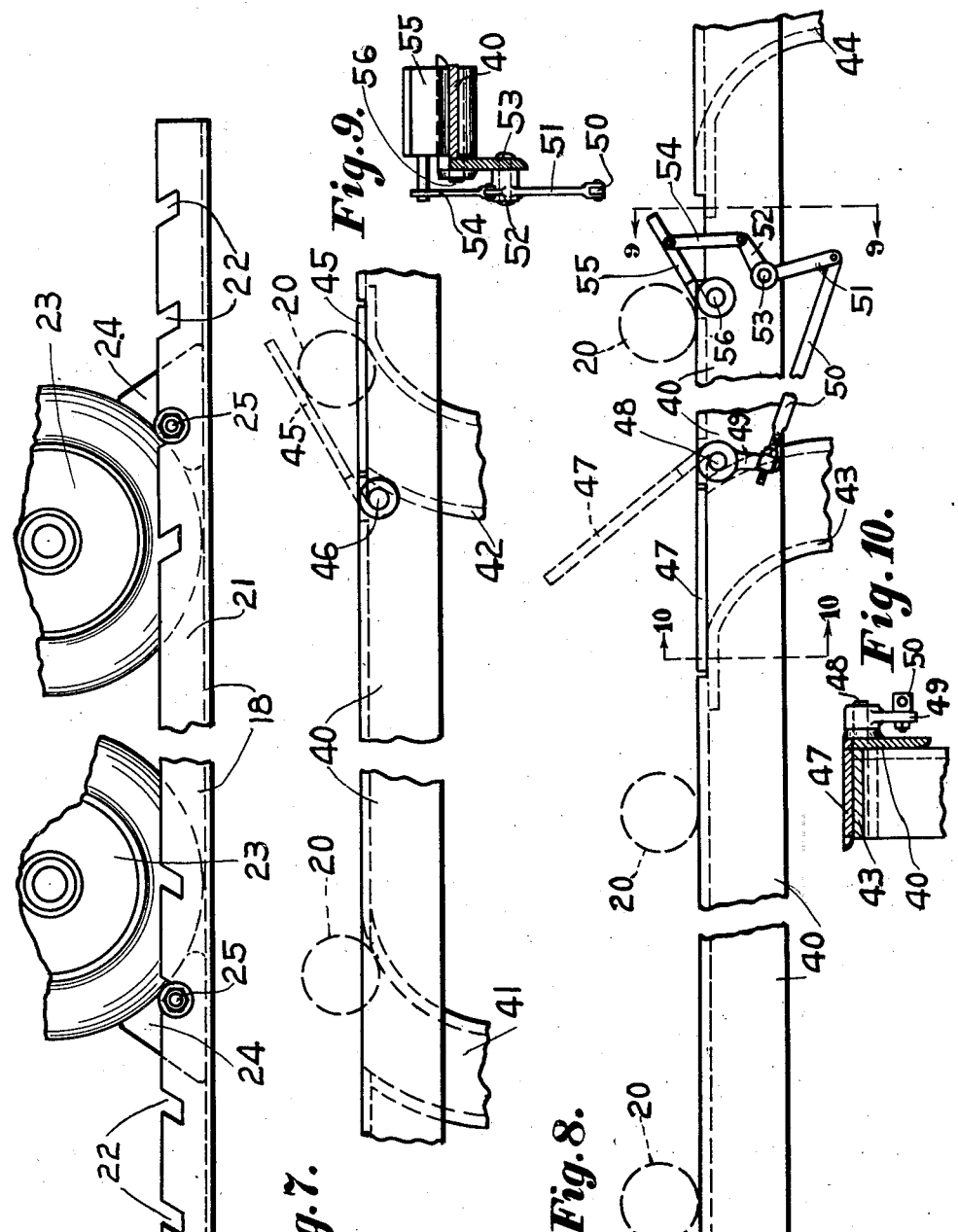
Inventor
J.F. Creedon
By Arthur H. Sturges
Attorney Patented Oct. 18, 1932

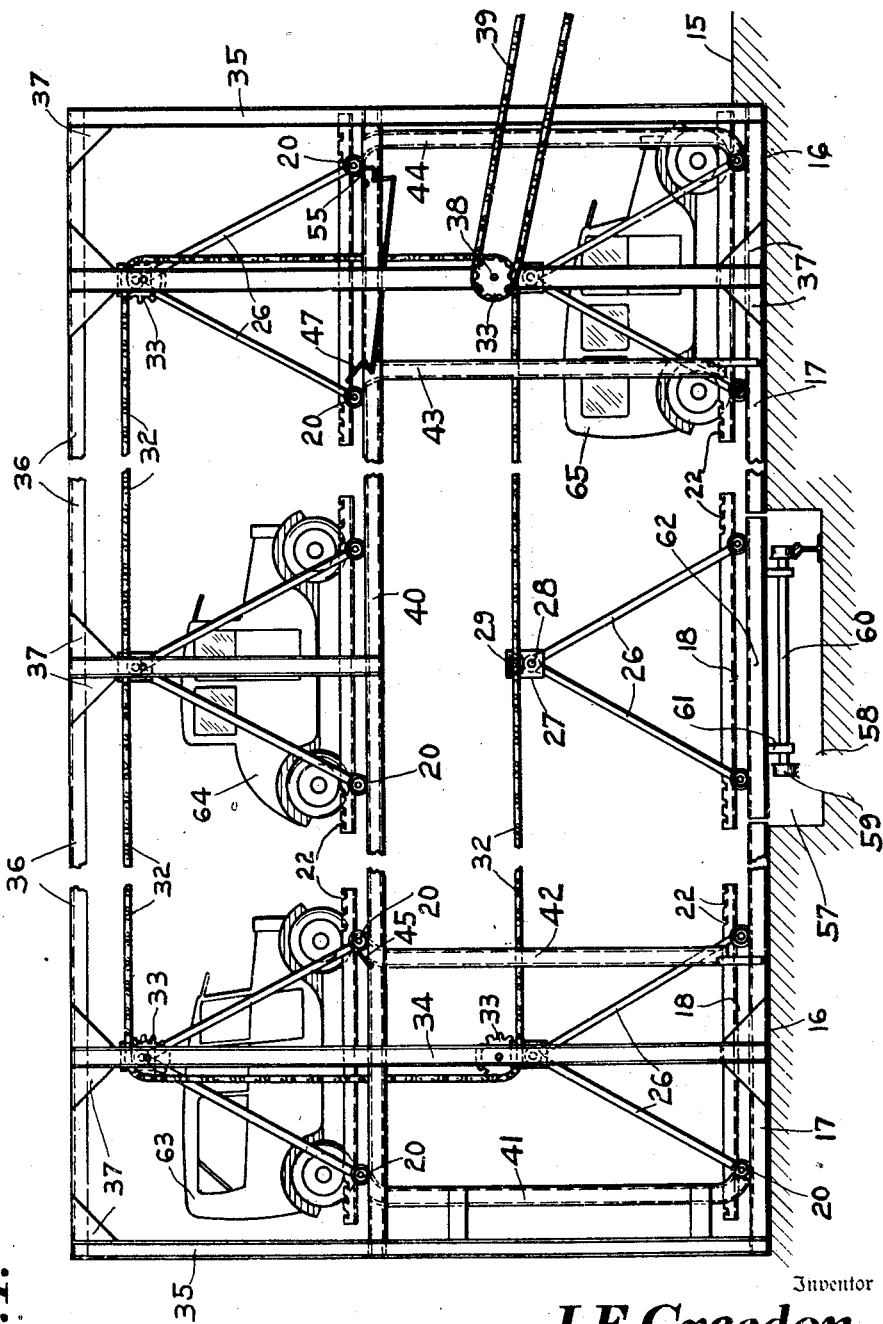

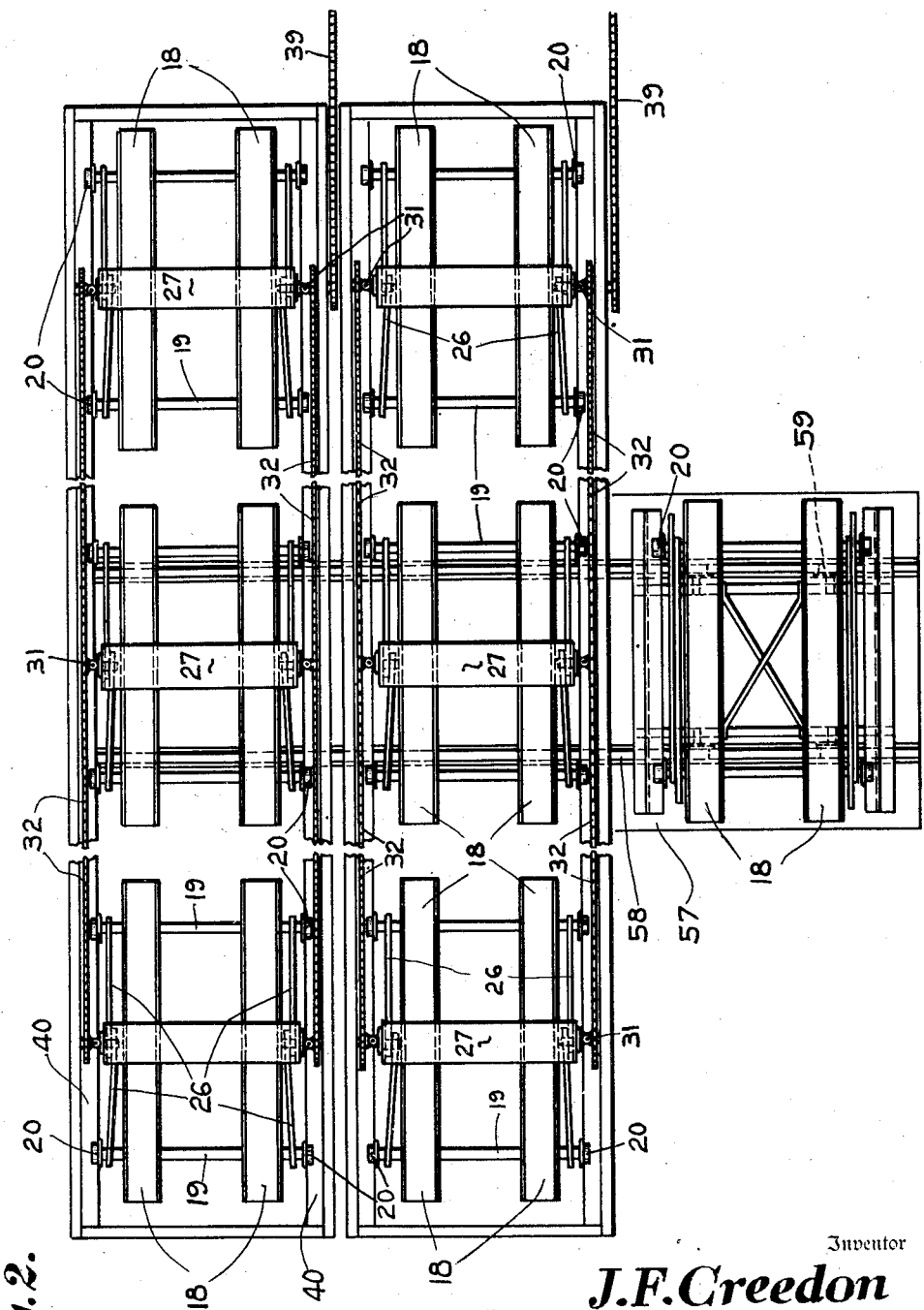

1,882,656

UNITED STATES PATENT OFFICE

JOSEPH F. CREEDON, OF OMAHA, NEBRASKA

AUTOMOBILE STORAGE DEVICE

Application filed February 10, 1930. Serial No. 427,410.

The present invention relates to improvements in automobile storing devices and has for an object to provide an improved automobile storing device for use in garages and like places whereby the present waste space adjacent the ceilings may be utilized for the storing of the automobiles.

Another object of the invention is to provide an improved automobile storing device whereby automobiles may be stored in superposed relation at two closely adjacent levels, the vehicles being supported independently of the actuating means except for the raising and lowering thereof between the two levels, whereby any desired horizontal extension of the storage means may be effected without substantially increasing the stresses upon the actuating means.

A further object of the invention is to provide an improved automobile storing device in which provision is made for easy access to the automobiles stored upon the upper level and whereby such automobiles may be moved conveniently and quickly into and out of the stored position.

A further object of the invention is to provide an improved automobile storing device in which the vehicles may be safely shifted to the upper position and safely restored to the floor level when required, adequate provision being made for the safe support of the vehicles at all times.

A still further object of the invention is to provide an improved automobile storing device in which a strong but compact assembly of parts co-operate in a simple and novel manner to produce the carrying and storing of automobiles.

A still further object of the invention is to provide an improved automobile storing device in which great numbers of the vehicles may be accommodated without requiring that any vehicle be placed in an inaccessible position.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a side elevation of an improved automobile storing device constructed according to the present invention and with certain parts being shown as broken away.

Figure 2 is a top plan view of the improved storing device.

Figure 3 is an end elevation of the same.

Figure 4 is a side elevation of one of the automobile cradles employed.

Figure 5 is a top plan view of the cradle with parts broken away.

Figure 6 is a fragmentary side view of the lower portion of a cradle showing the method of blocking a vehicle thereon.

Figure 7 is a fragmentary side view of the top storage track employed.

Figure 8 is a similar view showing the forward end portion of the top storage track.

Figure 9 is a transverse sectional view taken on the line 9—9 in Figure 8, and

Figure 10 is a similar view taken on the line 10—10 also in Figure 8.

Referring more particularly to the drawings, 15 designates the floor level in a garage over which the vehicles to be stored are adapted to be driven and onto the improved device which is mounted in a shallow pit 16 sunk beneath such floor line 15. Lying within the pit 16 are one or more pairs of spaced rails 17. As shown in Figure 3, these rails may be of an angle iron construction in cross section with the horizontal webs extending toward one another and functioning as tracks on which the rollers of the cradles for carrying the automobiles are adapted to travel.

The cradles are shown more particularly in Figures 4 and 5 and they include a pair of spaced and preferably flanged treads 18 onto which the wheels of the automobile are adapted to be driven. The tread plates 18 are carried in spaced relation by a pair of transverse shafts or rods 19 on the outer ends of which are mounted the flange wheels 20 which ride along the rails 17. The flanges of the tread plates 18 are shown in Figure 4 and at the end portions thereof such flanges are provided with reversely inclined notches 22. The purpose of these notches 22 is made plain in Figure 6, where the wheels 23 of an automobile are shown as occupying a tread plate 18 and as being confined laterally by the flanges 21.

Chocks or blocks 24 are shown as placed against the wheels 23 within the tread plates 18 in order to hold the vehicle against any casual or accidental movement on the cradle. The laterally extending pins 25 carried by the blocks 24 are adapted to slip into the notches 22 of the flanges 21 and the notches are so inclined that the pressure of the wheels 23 against the blocks 24 will tend to lock the pins 25 more securely in the inclined slots.

Returning to Figures 4 and 5, pairs of arms 26 are shown as forming parts of the cradles. Such arms 26 are secured at their lower ends to the outer portions of the shaft 19 and they extend upwardly and converge toward the plate 27 carrying removable pins 28 which are adapted to engage the upper perforated and overlapped ends of the arms 26. The pins 28 may be pulled out to permit the freeing of the arms 26 for a purpose later explained.

The plates 27 have riveted or otherwise affixed thereto socket plates 29. The socket plates carry ears 30 to receive a pivot pin 31 carried by the chain 32. Of course the pivot pin might be carried by the plate 29 if desired and the socket by the chain 32. The idea is to have a pivotal support for the cradle so that when the cradles are moved to the upper and lower positions, the cradle platforms or treadle plate may be at all times maintained in a horizontal position with the vehicle thereon carried upright.

Now there are two chains 32, one at each side of the cradles. As shown to advantage in Figure 1 the chains 32 extend about in a closed loop, which loop is substantially rectangular with a lower horizontal run and an upper horizontal run and with two vertical runs connecting the spaced horizontal runs of the chains. Upper and lower pairs of sprocket wheels 33 are provided to receive the chains and to maintain such chains in the rectangular closed loop as referred to. These sprockets 33 may be mounted upon any appropriate support, for instance upon the vertically disposed standards 34. These standards 34, together with the end standards 35, serve to support the top connecting beams 36. Triangular or other braces 37 may be mounted between the various posts and the upper beam 36 to reinforce and strengthen the construction. One shaft 38 of the sprocket wheels 33 may be extended, as shown in Figure 2, and provided with a chain drive 39 by which the loop chains 32 are made to travel around in the closed rectangular loop described and with such chains 32 the various cradles, six of which are shown in Figure 1. It will be understood however that any desired number of the cradles might be employed.

Now it is extremely to be desired that the cradles be guided and steadied in the movement thereof. This is accomplished during the horizontal movement of the cradles by the contact of the rollers 20 upon the lower rail or track 17. A similar function is performed by the upper track 40 which may be of a construction similar to the lower track 17. The upper track 40 may be carried by the standards 34 and 35. These upper tracks may be spaced at a desired distance above the lower tracks 17 but sufficiently below the ceiling and the upper beam 36 to permit an upper tier of vehicles to be supported above the ground level and the vehicles thereon. At or near the receiving end of the device, vertical pairs of channel guides 41 and 42 are provided and a similar pair of guides 43 and 44 are provided near the discharge end of the device. The entrance end of the device is at the left in Figure 1 and is indicated by X. The lower ends of the guide rails 41 and 42 as shown in Figure 1 are curved or deflected toward the right and in a similar manner the upper ends of such guides 41 and 42 are also curved toward the right. However, just the opposite effect is had in connection with the guide 43 and 44, both the lower and upper ends thereof being curved toward the left.

In Figure 7 the upper ends of the guides 41 and 42 are shown. Such guides merge with the upper track 40. The rollers or wheels 20 of the cradles are shown as emerging out from the upper open ends of the guides 41 and 42 and are about to move upon the track 40. The right hand guide 42 has associated with it a closure plate 45 which is shown as hinged at 46. This plate 45 forms an unbroken portion of the track 40 when in the closed position shown in full line, but it is adapted to be moved up to the dotted line position by the action of the wheel 20 in emerging from the guide 42. The plate 45 will thereupon drop by gravity back to the closed position and permit the rear wheel 20 to pass thereover when the cradle is moved along the upper horizontal rail 40 as hereinafter explained.

Referring now to Figures 8, 9 and 10, the association of the guides 43 and 44 with the upper track 40 is shown. The inner or left hand guide 43 is shown as having its upper end normally closed by a plate 47 hinged at 48 to the rail 40. This plate 47 is similar to the plate 45 above referred to and it is adapted to fill in the gap left in the track 50 at the mouth of the guide 43. This plate 47 is so weighted and disposed with reference to its center of gravity and its pivotal point 48 that it will assume automatically the closed position shown in full lines in Figure 8.

It may be lifted to the dotted line position to permit the wheels 20 to descend into the guide 43. The plate 47 carries downwardly extending arms 49 for receiving the ends of links 50. These links are in turn pivoted to the downwardly extending arms 51 of a bell crank lever having the companion arms 52. The bell crank levers are fulcrumed at 53 upon the rails 40 or other appropriate support. The bell crank arms 52 are connected by the links 54 to actuating plates 55 pivoted at 56 to the rails 40 or other suitable support. The actuating plates 55 also form parts of the rails 40 and they extend in the path of the wheels 20.

As shown in Figures 1 and 2, transverse sub pits 57 may be provided intermediate the device to a lower level than the pit 16. In the sub pit 57 are rails 58 adapted to support the traveling wheels 59 on the shaft 60. This shaft is provided with supporting arms 61 adapted to carry a central section 62 of the horizontal lower rails 17. As shown in Figure 2, the sub pit 57 extends transversely through the device and also to one side thereof, permitting of the central rail section 62 and the cradle thereon to be moved outwardly.

In the use of the device, a vehicle is driven into the device at the entrance point X and onto the two tread plates 18 of the cradle that happens to be in the initial position; it being understood that, by virtue of the pit arrangement, that the tread plates 18 will be at substantially floor level whereby the vehicle can be conveniently, easily and safely driven onto the initial cradle. The wheels of the vehicle are thereupon blocked in the manner shown in Figure 6 so as to prevent the vehicle from moving off the cradle during the shifting thereof. After the vehicle has been once moved into position and secured, the operator, through the medium of control means which are not shown and form no part of this invention, may put the operating chain 39 into motion whereby the rectangular loop chains 32 will be moved to elevate the vehicle to the position shown by the vehicle 63 in Figure 1. In executing this movement, the wheels 20 of the cradle carrying the vehicle 63 will be received within the channel guides 41 and 42 by which the cradle will be steadied in its movement. As the rollers or wheels 20 emerge from the upper curved ends of the guides 41 and 42 the forward wheel 20 will lift the plate 45 in the manner indicated in Figure 7 whereby the rollers 20 may move out and onto the upper rail 40.

When the next vehicle is received upon the next following cradle, the vehicle 63 will be shifted along the upper rail 40 to the position occupied by the vehicle shown at 64 in Figure 1. In so doing the forward roller or wheel 20 will move along the track 40 away from the plate 45 allowing the plate to drop by gravity whereby the rear wheel 20 may pass safely thereover. The plate 47 shown in Figure 8 will be normally in the closed position indicated in full line so that the forward wheels 20 of the cradles may move over without such wheels falling into the slot and into the guide 43 below. However, the forward wheels 20 encounter the actuating plates 55, such actuating plates, which are normally in the raised position, will be depressed in the manner indicated in Figure 1; thereby, through the arrangement of leverage, raising the plate 47 to the dotted line position indicated in Figure 8, thus opening the mouth of the guide 43 and permitting the rear wheels 20 of the cradles to descend into the guide 43. On the descending movement, the wheels 20 will be directed downwardly and steadied by the channel guides 43 and 44.

At 65 in Figure 1 is shown a vehicle in position to be driven off the device and onto the garage floor 15. Should intermediate racks require removal, this may be accomplished by the sectional intermediate portion 62 of the lower track, these sections being part of a carriage which runs upon the rail 58. Prior to such movement, the pull pin 28 may be removed thus freeing the arms 26 and thereby allowing such arms together with the tread plates 18 to be moved laterally on the carriage and freed from the chains and from the remainder of the mechanism. A vehicle may thus be moved onto or off the intermediate device so outwardly shifted. The cradle is subsequently returned to its position and coupled to the chain by reinserting the pins 28 in the openings in the arms 26. The space between the upper and lower tracks is such that the cradles will be lifted one at a time only and the actuating means will be subjected to the weight of only one of the cradles and its contents at a time.

It will be understood that any desired system of cross bracing of the rails and the standards may be employed whereby to hold the same in proper alignment and position with respect to each other. It will furthermore be understood that the chain 39 is connected to any appropriate source of power and any appropriate control mechanism therefor but as these parts form no essential feature of the invention and they are well understood, no illustration thereof is deemed necessary.

With the use of the improved device, automobiles may be stacked not only in the lower level at the floor line but also upon the cradle thereabove and as many of the devices may be provided in a garage as desired. As the automobiles are loaded upon the device, they are immediately elevated and thus moved out of the way, the next cradle being automatically brought into the initial position and readiness for the next vehicle. The vehicles will preferably be placed centrally upon the cradle and they will be held in this position by the chock blocks referred to. In any event any swinging movement of the cradle will be avoided by the use of the wheels engaging in the channel guides.

It is obvious that various changes and modifications may be made in the details of construction and design of the above specifically described embodiment of this invention without departing from the spirit thereof, such changes and modifications being restricted only by the scope of the following claims.

What is claimed is:—

1. In an automobile storing device, a plurality of cradles for receiving the vehicles, said cradles having wheels thereon, upper and lower tracks for receiving said wheels, inner and outer vertical channel guides connecting the upper and lower tracks for also receiving said wheels, said guides having upper and lower curved portions and movable rail plates forming part of the upper rails at the portion of the inner guide, and means for moving said cradles.

2. In an automobile storing device, upper and lower rails, inner and outer vertical channel guides connecting said upper and lower rails, said upper rails having gaps therein opposite the inner guide, hinge plates carried by said upper rails for bridging said gap, said plates adapted to close by gravity, means whereby certain of the plates may be automatically lifted, cradles for moving on said rails and having rollers to move in said guides, and means for moving said cradles.

3. In an automobile storing device, upper and lower rails, vertical guides connecting said upper and lower tracks, said upper rails having gaps therein opposite the upper ends of the guides and forming entrances to the same, pivoted rail plates upon the upper rails for closing said gaps, actuating rail plates also pivoted to the upper rail, connections between said actuating plates and certain of the gap plates, whereby when the actuating plates are closed the gap plates will be open, cradles for vehicles having rollers adapted to travel on said tracks and in said guide and for engaging said gap and actuating plates.

4. An automobile storage mechanism comprising cradles each composed of a wheeled horizontal platform and suspension members, superposed horizontal tracks arranged to directly support a plurality of cradles for horizontal movement the tracks being of sufficient length to normally support all of the cradles and stored automobiles, endless flexible actuating means having horizontal portions extending parallel with and located above the superposed tracks and vertical portions extending between the ends of the superposed tracks, the suspension means for the platforms of the cradles being pivotally connected with the actuating means and the cradles being arranged to be carried along the tracks by the horizontal portions of the said actuating means and the vertical portions being adapted to raise and lower the cradles from one track to the other and the space between the tracks being such that but one of the cradles will be lifted at a time and the actuating means will be subjected to the weight of only one of the cradles and its contents at a time.

5. An automobile storage mechanism comprising cradles each composed of a wheeled horizontal platform and suspension members, superposed horizontal tracks arranged to directly support a plurality of cradles for horizontal movement the tracks being of sufficient length to normally support all of the cradles and stored automobiles, endless flexible actuating means having horizontal portions extending parallel with and located above the superposed tracks and vertical portions extending between the ends of the superposed tracks, the suspension means for the platforms of the cradles being pivotally connected with the actuating means and the cradles being arranged to be carried along the tracks by the horizontal portions of the said actuating means and the vertical portions being adapted to raise and lower the cradles from one track to the other and the space between the tracks being such that but one of the cradles will be lifted at a time and the actuating means will be subjected to the weight of only one of the cradles and its contents at a time, and vertical guides arranged in pairs and connecting the upper and lower tracks at the ends thereof for guiding the cradles while they are being moved from one track to the other by the endless actuating means.

6. An automobile storage mechanism comprising cradles each composed of a wheeled horizontal platform and suspension members, superposed tracks arranged to directly support a plurality of cradles for horizontal movement, endless flexible actuating means having horizontal portions extending parallel with and located above the superposed tracks and vertical portions extending between the ends of the superposed tracks, the suspension means for the platforms of the cradles being pivotally connected with the actuating means and the cradles being arranged to be carried along the tracks by the horizontal portion of the said actuating means and the vertical portions being adapted to raise and lower the cradles from one track to the other and the space between the tracks being such that but one of the cradles will be lifted at a time and the actuating means will be subjected to the weight of only one of the cradles and its contents at a time, one of the said tracks being provided with a lateral movable section, and arranged to carry an automobile to and from the track of which the lateral movable section forms a part.

7. An automobile storage mechanism comprising cradles each composed of a wheeled horizontal platform and suspension members, superposed tracks arranged to directly support a plurality of cradles for horizontal movement, endless flexible actuating means having horizontal portions extending parallel with and located above the superposed tracks and vertical portions extending between the ends of the superposed tracks, the suspension means for the platforms of the cradles being pivotally connected with the actuating means and the cradles being arranged to be carried along the tracks by the horizontal portions of the said actuating means and the vertical portions being adapted to raise and lower the cradles from one track to the other and the space between the tracks being such that but one of the cradles will be lifted at a time and the actuating means will be subjected to the weight of only one of the cradles and its contents at a time, the lower track being provided with a lateral movable section, and a carriage supporting the section for moving the same to and from the lower track.

In testimony whereof I have affixed my signature.

JOSEPH F. CREEDON.